United States Patent [19]

Kawata et al.

[11] 4,350,319

[45] Sep. 21, 1982

[54] CONTROL FOR AN ELECTROMAGNETIC SOLENOID VALVE

[75] Inventors: Shoji Kawata, Okazaki; Kyo Hattori; Kazuhiro Sakurai, both of Susono, all of Japan

[73] Assignees: Aisin Seiki Kabushiki Kaisha, Kariya; Toyota Jidosha Kogyo Kabushiki Kaisha, Toyota, both of Japan

[21] Appl. No.: 152,293

[22] Filed: May 22, 1980

[30] Foreign Application Priority Data

May 26, 1979 [JP] Japan .................................. 54/65288

[51] Int. Cl.³ .............................................. F16K 31/08
[52] U.S. Cl. ...................................... 251/65; 251/139; 137/625.48; 361/152; 361/194
[58] Field of Search ................. 251/129, 141, 137, 65; 361/152, 196, 194; 123/490; 137/625.48

[56] References Cited

U.S. PATENT DOCUMENTS

| 2,637,343 | 5/1953 | Matthews . | |
| 3,001,549 | 9/1957 | Nelson et al. . | |
| 3,099,280 | 7/1963 | Holzbock . | |
| 3,368,788 | 2/1968 | Padula | 251/141 |
| 3,455,536 | 7/1969 | Barker | 251/129 X |
| 3,942,485 | 3/1976 | Suda et al. | 123/490 |
| 3,984,745 | 10/1976 | Minalga . | |
| 4,040,445 | 8/1977 | McCormick | 251/129 X |
| 4,216,938 | 8/1980 | Inada et al. | 251/139 X |

OTHER PUBLICATIONS

I.B.M. Technical Disclosure Bulletin, High Speed Valve, A. W. Orlando, vol. 6, No. 5, Oct. 1963.

Primary Examiner—Arnold Rosenthal
Attorney, Agent, or Firm—Finnegan, Henderson, Farabow, Garrett & Dunner

[57] ABSTRACT

A control device for a solenoid valve including a valve body provided with a fluid inlet and fluid outlet ports, a valve member provided in the valve body and movable between a closed and open positions and a solenoid coil for electromagnetically actuating the valve member. The control device includes a switching circuit which is adapted to alternatively direct an energizing electric current to the solenoid coil in one direction so that the valve member is moved toward the open position and in the opposite direction so that the valve member is maintained in the closed position. Since the valve member is maintained in the closed position by the electromagnetic force, it is possible to prevent the valve member from being moved out of the closed position even under vibrations to which the valve may be subjected in use.

4 Claims, 3 Drawing Figures

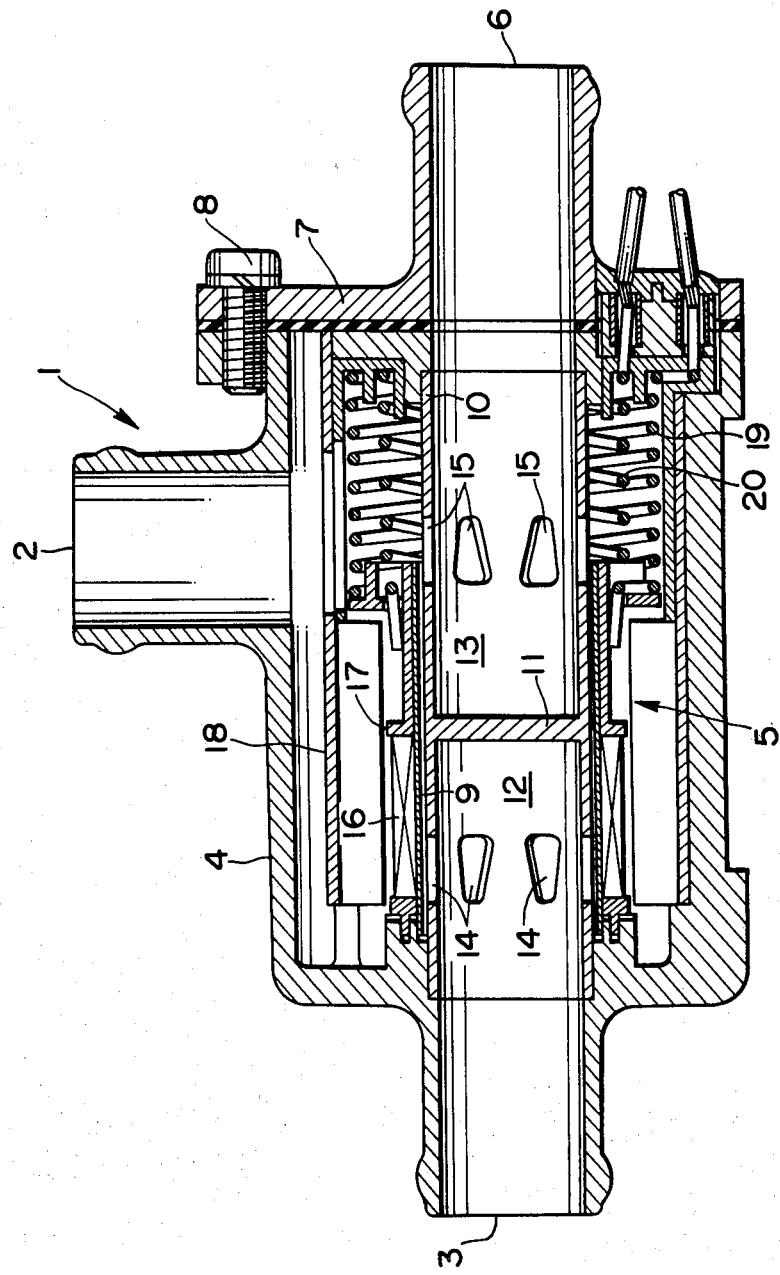

CONTROL FOR AN ELECTROMAGNETIC SOLENOID VALVE

The present invention relates to solenoid valves, and more particularly to methods and devices for controlling solenoid valves.

Solenoid valves are widely used in various fields for controlling fluid flows. One example of application of such solenoid valves can be found in an exhaust gas purifying system for automobile engines. In such a system, use is made of an electromagnetically operated flow control valve for admitting air to a catalytic gas purifying device in accordance with various parameters such as the engine temperature, the engine intake pressure and the engine speed. The control valve includes an axially slidable valve member which is associated with an electromagnetic linear motor so as to be moved between a closed position and a full open position. The valve member is normally biased by means of a resilient spring to the closed position and the electromagnetic linear motor actuates, when energized, the valve member toward the open position. The valve member can appropriately take an intermediate position between the closed and full open position, the position of the valve member and therefore the amount of opening of the control valve being determined by the input to the linear motor which corresponds to the aforementioned parameters. Thus, the control valve is able to function to lead air into the catalytic device in an amount suitable for maintaining the concentration of the exhaust gas in a gaseous fluid which is being directed to the catalytic device to a value most desirable for the proper operation of the catalyst.

Where it is not necessary to supply air through the control valve, the valve member is held in the closed position normally under the force of biasing spring. However, since the control valve is subjected to vibrations which are transmitted thereto from the body of the automobile on which it is mounted, the valve member is often moved out of the closed position under such vibrations so that a noticeable amount of air is allowed to pass to the catalytic device. Thus, the catalytic device may often be operated out of the most desirable range of the exhaust gas concentration.

It is therefore an object to provide a method and a device for controlling a solenoid valve in which the valve can be maintained in the closed position positively so that it is not inadvertently opened even when it is subjected to vibrations in service.

Another object of the present invention is to provide a method and a device for controlling a solenoid valve in which the solenoid coil of the valve is energized, to maintain the valve in the closed position, in the direction opposite to the direction of energization of the coil where it is desired to open the valve.

According to the present invention, in order to accomplish the above and other objects, there is provided a method for controlling a solenoid valve which includes a valve body provided with fluid inlet port means and fluid outlet port means, a valve member provided in said valve body and movable between a closed position in which said fluid outlet port means is blocked from the fluid inlet port means and an open position in which said fluid outlet port means is communicated with said fluid inlet port means, and solenoid coil means for electromagnetically actuating the valve member, said method being comprised of energizing for opening the valve said solenoid coil means in one direction so as to move said valve member toward said open position for allowing fluid to flow from said fluid inlet port means to said fluid outlet port means and energizing when said valve is in the closed position and solenoid coil means in the opposite direction for positively maintaining the valve member in the closed position.

In another aspect of the present invention, there is provided a device for controlling a solenoid valve which includes a valve body provided with fluid inlet port means and fluid outlet port means, a valve member provided in said valve body and movable between a closed position in which said fluid outlet port means is blocked from the fluid inlet port means and an open position in which fluid outlet port means is communicated with said fluid inlet port means, and solenoid coil means for electromagnetically actuating the valve member, said device comprising switching means which is adapted to alternately direct an energizing electric current to said solenoid coil means in one direction so that the valve member is moved toward said open position and in the opposite direction so that the valve member is maintained in the closed position. The valve member may be associated with biasing spring means so that it is normally biased toward the closed position. The electromagnetic force produced by the solenoid coil means under the energizing electric current supplied thereto in said opposite direction then functions to assist the biasing spring means in maintaining the valve member in the closed position. The switching means of the control device may be associated with time delay means so that switching of the current from said one direction to said opposite direction is effected after a predetermined time delay after a switching signal is applied to said switching means.

According to the present invention, the valve member of the solenoid valve is maintained in the closed position under the electromagnetic force produced at the solenoid coil means. It should therefore be understood that, even when the solenoid valve is subjected to vibrations in service, the valve member can positively maintained in the closed position. Thus, it is possible to prevent an inadvertent displacement of the valve member from the closed position.

The above and other objects and features of the present invention will become apparent from the following descriptions of a preferred embodiment taking reference to the accompanying drawings, in which:

FIG. 2 is a sectional view of a solenoid valve which is used in the system shown in FIG. 1; and, FIG. 3 is an electric wiring diagram of the solenoid valve control device in accordance with one embodiment of the present invention.

Figure 1:
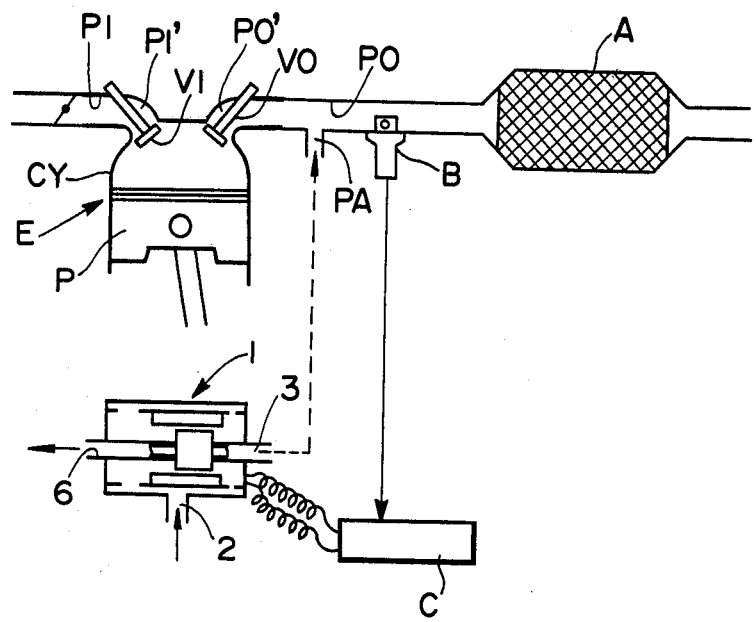
FIG. 1 is a diagrammatical illustration of an internal combustion engine exhaust gas purifying system to which the present invention can be applied.

Referring now to the drawings, particularly to FIG. 1, there is shown an internal combustion engine E which includes a cylinder CY and a piston P which reciprocates in the cylinder CY. The cylinder CY is provided with intake and exhaust ports PI' and PO' which are respectively connected with intake and exhaust passages PI and PO respectively through intake and exhaust valves VI and VO. In the exhaust passage PO, there is provided a catalytic exhaust gas purifying device A which may be of a known type. In order to provide a supply of fresh air to the catalytic exhaust gas purifying device A when desired, the exhaust passage PO is formed with an air port PA which is connected through a solenoid type control valve 1 with an air supply source such as an air pump (not shown).

As shown in FIG. 1, the solenoid valve 1 is of a three port type which has an inlet port 2, an outlet port 3 and a drain port 6. The inlet port 2 is connected with the aforementioned air pump and the outlet port 3 is connected with the air port PA formed in the exhaust passage PO of the engine E. The exhaust passage PO is provided with an $O_2$ sensor B which functions to detect the oxygen content in the gas flowing through the exhaust passage PO. The signal as produced in the $O_2$ sensor B is applied to a control device C which is adapted to control the solenoid valve 1.

Referring now to FIG. 2, it will be noted that the solenoid valve 1 includes a valve body 4 in which the aforementioned ports 2 and 3 are formed. At an end of the valve body 4 opposite to the outlet port 3, there is attached an end cover 7 which is formed with the aforementioned drain port 6. In the valve body 4, there is provided a linear motor assembly 5 which includes a hollow cylindrical core 10 which is fitted to the valve body 4 and has a central partition wall 11 which separates the interior of the core 10 into outlet and drain chambers 12 and 13, respectively. The chambers 12 and 13 are respectively communicated with the ports 3 and 6. The cylindrical core 10 is formed with a plurality of apertures 14 opening to the outlet chamber 12 and a plurality of apertures 15 opening to the drain chamber 13.

Around the cylindrical core 10, there is a sliding valve member 9 which is axially movable along the outer surface of the core 10. On the outer surface of the slidable valve member 9, there is mounted a bobbin 17 which has a solenoid coil 16 wound thereon. There is further provided a permanent magnet which is arranged so as to produce a magnetic flux which intersects perpendicularly with the solenoid coil 16 on the bobbin 17. A yoke 18 of a magnetic material is provided around the bobbin 17 for providing a magnetic path together with the core 10. The bobbin 17 and therefore the sliding valve member 9 are resiliently biased toward left as shown in FIG. 2 by coil springs 19 and 20 so that the valve member 9 is maintained in the closed position wherein it covers the apertures 14 in the core 10 when the solenoid coil 16 is de-energized.

In the position of the valve member 9 shown in FIG. 2, the apertures 15 in the core 10 are uncovered so that the inlet port 2 is connected through the apertures 15 and the drain chamber 13 to the drain port 6. When the solenoid coil 16 is energized in one direction, the sliding valve member 9 is driven against the biasing force of the springs 19 and 20 so that the apertures 14 of the core 10 are uncovered. Thus, the inlet port 2 is connected through the apertures 14 and the outlet chamber 12 to the outlet port 3 whereby the air is supplied from the air pump to the engine exhaust passage PO. The area of openings of the aperture 14 is determined by the axial position of the valve member 9 which is a function of the current to the solenoid coil 16. Thus, the air flow through the solenoid valve 1 is controlled in amount in accordance with the current to the solenoid coil 16.

Since the solenoid valve 1 is subjected to vibrations in service, there is a possibility that the sliding valve member 9 is inadvertently displaced again the force of the coil springs 19 and 20 when the solenoid coil 16 is de-energized. In order to eliminate the problem, the control device C is provided with a switching device so that the solenoid coil 16 is energized alternately in one direction and in the opposite direction either to move the valve member 9 to an open position or to hold the valve member 9 electromagnetically in the closed position.

Figure 3:
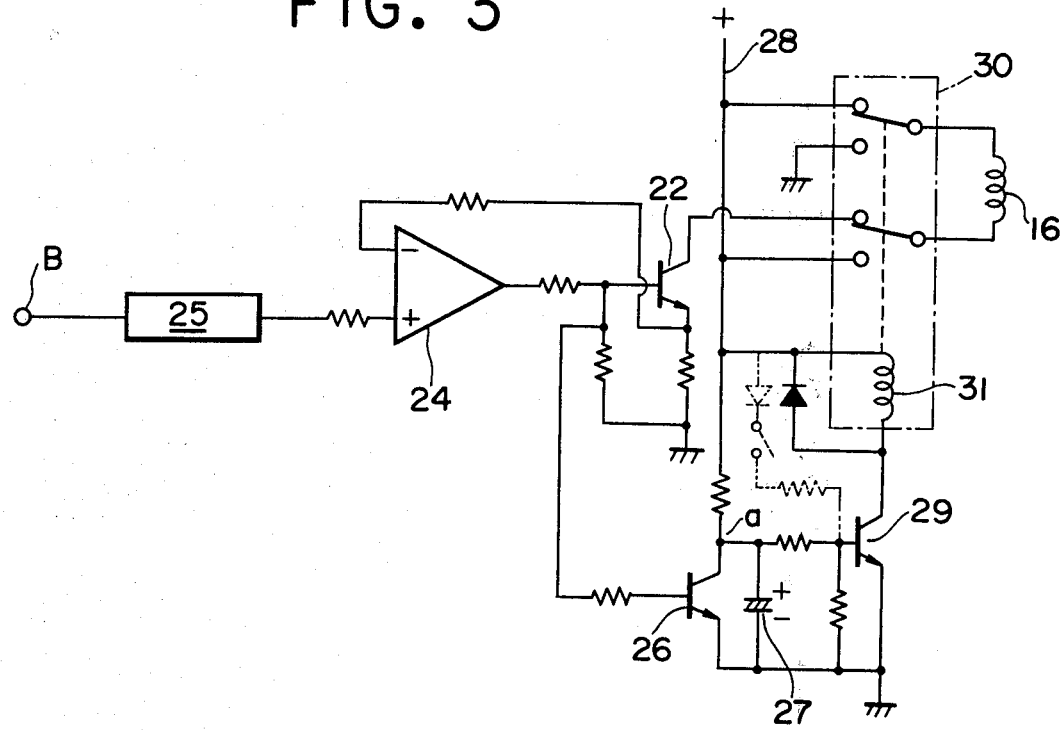

Referring to FIG. 3, there is shown an example of a circuit in the control device C. In the circuit, it will be noted that one end of the solenoid coil 16 is normally connected through a relay 30 with an electric power source 28. The other end of the solenoid coil 16 is normally connected through the relay 30 with the emitter of a transistor 22. The relay 30 has a solenoid 31 which is adapted to be energized to connect the said one end of the solenoid coil 16 to earth and the said other end of the solenoid coil 16 to the power source 28.

The $O_2$ sensor B is connected with a processing device 25 which produces an output in accordance with the signal received from the $O_2$ sensor B. The output of the processing device 25 is applied to an amplifier 24 of which the output is connected with the base of the transistor 22. The collector of the transistor 22 is grounded through a resistor. The output of the amplifier 24 is further connected with the base of a second transistor 26 which has an emitter connected with the power source 28 and a collector connected with the earths.

The solenoid coil 31 is on one hand connected with the power source 28 and on the other hand with the emitter of a third or control transistor 29. The base of the transistor 29 is connected through a resistor with the emitter of the second transistor 26 as shown in FIG. 3. The collector of the transistor 29 is grounded. Between the emitter and the collector of the transistor 26, there is connected a time delay capacitor 27.

When the output signal from the $O_2$ sensor B indicates that a supply of air to the catalytic device A is necessary, the processor 25 produces an output signal which is amplified by the amplifier 24 and applied to the base of the transistor 22. At the same time, the output of the amplifier 24 is also applied to the base of the second transistor 26. Thus, the transistors 22 and 26 becomes conductive. Since the voltage at the emitter of the transistor 26 is thus decreased, the transistor 29 becomes non-conductive so that the solenoid 31 of the relay 30 is de-energized. It should therefore be understood that in this instance electric current flows from the power source 28 through the solenoid coil 16 and the transistor 22 to thereby drive the valve member 9 toward the open position against the action of the springs 19 and 20. The distance of the axial movement of the valve member 9 is determined by the amount of current through the solenoid coil 16, which is dependent on the value of the signal applied from the amplifier 24 to the base of the transistor 22.

When it is not required to supply air to the catalytic device A, there is no output signal from the amplifier 24 so that the transistors 22 and 26 become non-conductive. The voltage at the emitter of the transistor 26 is therefore increased and the increased voltage is applied to the base of the transistor 29. Thus, the transistor 29 becomes conductive so that an electric current is allowed to flow through the solenoid coil 31 of the relay 30. The relay 30 is therefore energized so that an electric current flows through the solenoid coil 16 in the opposite direction. The valve member 9 is therefore forced electromagnetically into the closed position. It is thus possible to maintain the valve member 9 positively in the closed position to thereby prevent inadvertent movement of the valve member 9 under the influence of vibrations to which the valve is subjected in use.

From the foregoing descriptions, it will be understood that the arrangement is effective to prevent any undesirable supply of air when the engine operating condition does not require a supply of fresh air to the catalytic device. In the illustrated arrangement, since the capacitor 27 is connected between the emitter and the collector of the transistor 26, it is possible to prevent chattering of the relay 30 which may otherwise be produced when the output from the amplifier 24 is repeatedly interrupted with short intervals. Only when the output signal from the amplifier is interrupted beyond a predetermined time, determined by the capacity of capacitor 27, is the transistor 29 turned on to energize the relay solenoid coil 31.

In the foregoing descriptions, the control device C has been designed to receive an input signal from $O_2$ sensor B so that fresh air is introduced into the catalytic device A when there is a demand for oxygen. However, during the engine warming up period or under a high load engine operation, it may be required to close the solenoid valve 1 even when the $O_2$ sensor B indicates that there is a demand for oxygen. In order to accomplish the function, the voltage of the power source 28 may be applied through a line including a diode, a resistor and an engine temperature switch or an engine load switch as shown by phantom lines in FIG. 3.

The invention has thus been shown and described with reference to a specific embodiment, however, it should be noted that the invention is in no way limited to the details of the illustrated arrangements but changes and modifications may be made without departing from the scope of the appended claims.

We claim:
1. A solenoid controlled valve device comprising:
   a valve body having fluid inlet port means and fluid outlet port means;
   a valve member disposed within said valve body and having a closed position wherein said fluid outlet ports means is blocked from fluid communication with said fluid inlet port means, and an open position wherein said fluid outlet port means is in fluid communication with said fluid inlet port means;
   solenoid means for electromagnetically controlling the movement of said valve member, said solenoid means including a hollow core disposed in said valve body, a bobbin slidably mounted on the core, a coil disposed about the bobbin, and magnetic means fixed in the valve body for exposing the coil to a substantially perpendicular magnetic field;
   and switching means for alternately directing an electric current to said coil in one direction wherein said valve member is moved toward said open position and in the opposite direction wherein said valve member is maintained in said closed position, said switching means being responsive to a switching signal; and
   time delay means for switching the direction of said current from said one direction to said opposite direction after a predetermined time delay from application of said switching signal to said switching means.

2. A device in accordance with claim 1, also including sensor means for generating a valve open signal when said valve is to be opened, a first circuit responsive to receipt of said valve open signal for supplying an electric current in one direction to said coil, said time delay means being actuated by the absence of said valve open signal;
   and a second circuit responsive to said time delay means for supplying an electric current to said coil in the opposite direction after a predetermined time delay for holding said valve member in the closed position.

3. A device in accordance with claim 2, wherein said sensor means senses the presence of oxygen and generates the valve open signal in response to the content of oxygen in the vicinity of said sensor means.

4. A device in accordance with claim 3, wherein said first circuit includes a first transistor connected to said coil and said sensor means; and said time delay means includes a third circuit having second and third transistors, said coil and said capacitor being connected between the emitter and collector of said second transistor for applying a voltage to the third transistor.

* * * * *